US010979397B2

(12) United States Patent
Williams (10) Patent No.: US 10,979,397 B2
(45) Date of Patent: Apr. 13, 2021

(54) DYNAMIC CLUSTER HOST INTERCONNECTIVITY BASED ON REACHABILITY CHARACTERISTICS

(71) Applicant: Red Hat, Inc., Raleigh, NC (US)

(72) Inventor: Daniel C. B. Williams, Minneapolis, MN (US)

(73) Assignee: Red Hat, Inc., Raleigh, NC (US)

( * ) Notice: Subject to any disclaimer, the term of this patent is extended or adjusted under 35 U.S.C. 154(b) by 259 days.

(21) Appl. No.: 15/989,292

(22) Filed: May 25, 2018

(65) Prior Publication Data

US 2019/0364017 A1 Nov. 28, 2019

(51) Int. Cl.
*H04L 29/06* (2006.01)

(52) U.S. Cl.
CPC ........ *H04L 63/029* (2013.01); *H04L 63/0272* (2013.01)

(58) Field of Classification Search
CPC .......................... H04L 63/029; H04L 63/0272
See application file for complete search history.

(56) References Cited

U.S. PATENT DOCUMENTS

| | | | |
|---|---|---|---|
| 7,046,666 B1* | 5/2006 | Bollay | H04L 29/12009 370/392 |
| 9,509,600 B1 | 11/2016 | Szabo et al. | |
| 9,596,099 B2 | 3/2017 | Yang et al. | |
| 9,813,303 B1* | 11/2017 | Guigli | H04L 61/2076 |
| 9,858,104 B2 | 1/2018 | Tripathi et al. | |
| 9,886,445 B1* | 2/2018 | Gupta | G06F 16/1744 |
| 2013/0058229 A1* | 3/2013 | Casado | H04L 45/745 370/252 |
| 2013/0254359 A1* | 9/2013 | Boutros | H04L 61/103 709/223 |
| 2015/0096011 A1* | 4/2015 | Watt | H04L 63/0272 726/15 |
| 2015/0098475 A1 | 4/2015 | Jayanarayana et al. | |
| 2015/0195137 A1 | 7/2015 | Kashyap et al. | |
| 2016/0094365 A1* | 3/2016 | Subramaniyam | H04L 12/4625 370/401 |
| 2016/0261496 A1* | 9/2016 | Chang | H04L 12/4633 |
| 2016/0294728 A1* | 10/2016 | Jain | H04L 47/82 |

(Continued)

OTHER PUBLICATIONS

Author Unknown, "Huawei CloudEngine 12800 Series," VXLAN Technology White Paper, Issue 6, Jul. 28, 2016, Huawei Technologies Co., Ltd., 238 pages.

(Continued)

*Primary Examiner* — Jason Chiang
(74) *Attorney, Agent, or Firm* — Withrow & Terranova, PLLC (57) ABSTRACT

Dynamic cluster host interconnectivity based on reachability characteristics is disclosed. A first host receives a request from a first container executing on the first host to send a communication to a second container on a second host. The first host determines that the first host can communicate with the second host via a layer two communications protocol or that the first host can communicate with the second host only via a layer three communications protocol. The first host identifies, in a host accessibility structure, whether the first host can communicate with the second host via the layer two communications protocol or the layer three communications protocol.

7 Claims, 5 Drawing Sheets

(56) References Cited

U.S. PATENT DOCUMENTS

| | | | |
|---|---|---|---|
| 2016/0316026 A1* | 10/2016 | Lapuh | H04L 67/16 |
| 2017/0085502 A1* | 3/2017 | Biruduraju | H04L 12/4633 |
| 2017/0149729 A1 | 5/2017 | Tsirkin | |
| 2017/0180250 A1* | 6/2017 | Shen | G06F 9/45558 |
| 2017/0289065 A1* | 10/2017 | Zhu | H04L 49/15 |
| 2018/0025083 A1* | 1/2018 | Agarwal | G06F 16/951 |
| | | | 707/706 |
| 2019/0109783 A1* | 4/2019 | Kommula | H04L 45/26 |
| 2019/0158397 A1* | 5/2019 | Liu | H04L 45/64 |

OTHER PUBLICATIONS

Author Unknown, "Configure 2 WAN Failover in Mikrotik," http://mikrotiknetworking.com/configure-2-wan-failover-in-mikrotik/, Jun. 13, 2017, 6 pages.

Bernaille, Laurent, "Deep dive into Docker Overlay Networks: Part 2," Blog post, May 9, 2017, D2SI, 11 pages.

\* cited by examiner

DYNAMIC CLUSTER HOST INTERCONNECTIVITY BASED ON REACHABILITY CHARACTERISTICS

TECHNICAL FIELD

The examples relate generally to communications between hosts in a cluster, and in particular to dynamic cluster host interconnectivity based on reachability characteristics.

BACKGROUND

Hosts in a cluster that execute containers for different tenants, such as different companies, often utilize tunneling protocols, such as virtual local area networks (VLANs), to isolate the traffic of the different tenants.

SUMMARY

The examples disclosed herein implement dynamic cluster host interconnectivity based on reachability characteristics. The examples isolate traffic between containers executing on different hosts, but which are associated with the same tenant, by dynamically selecting a tunneling protocol based on whether the hosts can communicate over a layer two network, or whether the hosts can only communicate over a layer three network.

In one example a method is provided. The method includes receiving, by a first host comprising a processor device, a request from a first container executing on the first host to send a communication to a second container on a second host. The method further includes determining, by the first host, that the first host can communicate with the second host via a layer two communications protocol or that the first host can communicate with the second host only via a layer three communications protocol. The method further includes identifying, in a host accessibility structure, whether the first host can communicate with the second host via the layer two communications protocol or the layer three communications protocol.

In another example a host is provided. The host includes a memory and a processor device coupled to the memory. The processor device is to initiate a first container, receive a request from the first container to send a communication to a second container on a second host, determine that the host can communicate with the second host via a layer two communications protocol or that the host can communicate with the second host only via a layer three communications protocol, and identify, in a host accessibility structure, whether the host can communicate with the second host via the layer two communications protocol or the layer three communications protocol.

In another example a computer program product is provided. The computer program product is stored on a non-transitory computer-readable storage medium and includes instructions to cause a processor device to initiate a first container on a first host. The instructions further cause the processor device to receive a request from the first container to send a communication to a second container on a second host. The instructions further cause the processor device to determine that the first host can communicate with the second host via a layer two communications protocol or that the first host can communicate with the second host only via a layer three communications protocol. The instructions further cause the processor device to identify, in a host accessibility structure, whether the first host can communicate with the second host via the layer two communications protocol or the layer three communications protocol.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first host" and "second host," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Hosts in a cluster that execute containers for different tenants, such as different companies, often utilize isolation or tunneling protocols, such as virtual local area networks (VLANs), to isolate the traffic of the different tenants. However, VLANs are implemented over layer two communication protocols, such as a media access control (MAC) layer, and require that all hosts be on the same layer two network. For large scale container cluster environments, such as may be offered by cloud computing service providers, it may be impractical, or at least undesirable, to ensure that all hosts are on the same layer two network. It would be preferable for hosts to be able to be accessible by both a layer two network and a layer three network (e.g., the internet protocol (IP) layer) and still be able to isolate traffic between related containers. In circumstances where a host is only available via a layer three network, layer three isolation or tunneling protocols, such as the virtual extensible local area network (VXLAN) protocol, the Generic Routing Encapsulation (GRE) protocol, the Generic Network Virtualization Encapsulation (GENEVE) protocol, or the Layer 2 Tunneling Protocol (L2TP), may be utilized. However, one host in a container cluster typically does not know whether another host is located on the same layer two network as the one host, or is only accessible over a layer three network, such as the Internet. While an operator may manually configure this information into each host, in the context of large container clusters that involve hundreds or thousands of hosts, and in which containers may be relatively continuously initiated and terminated based on demand, manual configuration of such information may be impractical. It is generally advantageous, where possible, to implement isolation over a layer two communication protocol because isolation/tunneling technologies over a layer three communication protocol can have significant network throughput performance impacts.

The examples disclosed herein implement dynamic cluster host interconnectivity based on reachability characteristics. The examples isolate traffic between containers executing on different hosts, but which are associated with the same tenant, by selecting a tunneling protocol based on whether the hosts can communicate over a layer two network, or whether the hosts can only communicate over a layer three network. In one example, a first container associated with a tenant and which executes on a first host attempts to communicate with a second container associated with the same tenant and which executes on a second host. The first host dynamically determines whether the second host is reachable via a layer two network, such as an Ethernet network, or is only reachable via a layer three network, such as an IP network. The first host may maintain this information in a host accessibility structure. If the second host is reachable via the layer two network, the first host uses a layer two tunneling protocol, such as VLAN, to communicate with the second host. If the second host is only reachable via the layer three network, the first host uses a layer three tunneling protocol, such as VXLAN, to communicate with the second host. Among other advantages, this eliminates a need for an operator to continually manually configure a large number of hosts as new hosts are added to a cluster or removed from a cluster, and ensures that a preferable isolation mechanism is automatically selected to isolate communications between containers that belong to the same ownership group.

Figure 1:
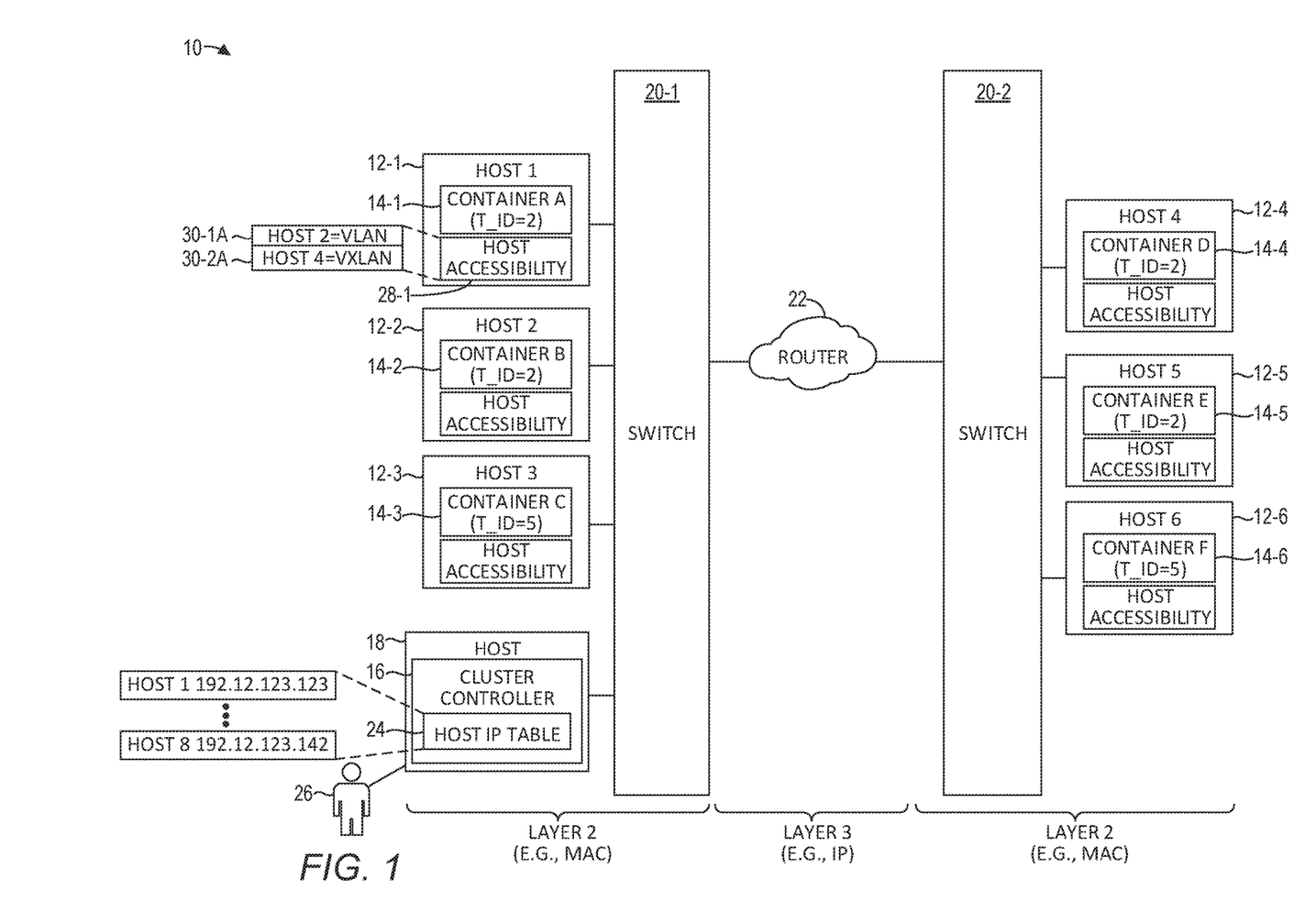
FIG. 1 is a block diagram of an environment in which examples may be practiced.

FIG. 1 is a block diagram of an environment 10 in which examples may be practiced. The environment 10 includes a plurality of hosts 12-1-12-6 (generally, hosts 12) that form a cluster of hosts 12 which are available for executing processes, such as, by way of non-limiting example, containers 14-1-14-6 (generally, containers 14). The initiation and termination of the containers 14 are managed via a cluster controller 16 that executes on a host 18. The cluster controller 16 may comprise, by way of non-limiting example, an OpenShift or Kubernetes cluster controller modified to operate in accordance with the examples disclosed herein. The cluster of hosts 12 executes containers 14 that are associated with a plurality of different tenants. Tenancy, as used herein, is a categorization mechanism to categorize sets of containers 14, such that containers 14 associated with the same tenant have the same tenant ID, and have a different tenant ID than containers 14 associated with a different tenant. Communications between containers 14 associated with the same tenant are generally isolated from containers 14 associated with another tenant. For example, the hosts 12 may prevent a container 14 associated with one tenant from receiving a communication sent by a container 14 associated with a different tenant. Any characteristic may be used to categorize the containers 14 via tenancy, such as, by way of non-limiting example, containers 14 associated with different companies, containers 14 associated with different departments within the same company, or the like. For purposes of illustration, the examples disclosed herein will use tenancy to refer to different companies, and containers 14 associated with the same company are assigned the same tenant identifier (ID).

Each host 12 may comprise, for example, a computing device, or a virtual machine implemented on a computing device. Each host 12 includes, or shares, a processor device and a memory associated with a computing device. Each host 12 also has at least one IP address associated therewith. The hosts 12-1-12-3, 18 are communicatively coupled together via a layer two networking mechanism, an Ethernet switch 20-1. The phrase "layer two" refers to switching technologies (sometimes referred to as "switches" or "hubs") that operate by forwarding messages based on addresses that correspond to layer two of the Open Systems Interconnection model (OSI model), sometimes referred to as physical addressing, and that include, for example, forwarding messages based on MAC addresses or other data link layer addressing mechanisms. The hosts 12-4-12-6 are communicatively coupled together via a layer two (e.g., data link layer) switch 20-2. The layer two switches 20-1 and 20-2 may be hundreds or thousands of miles apart from one another, and are communicatively coupled together via at least one layer three networking mechanism, in this example a router 22. The phrase "layer three" refers to switching technologies (sometimes referred to as "routers") that operate by forwarding messages based on addresses that correspond to layer three (e.g., network layer) of the OSI model, sometimes referred to as logical addressing, and that include, for example, forwarding messages based on IP addresses or other network layer addressing mechanisms. Although only one router 22 is illustrated for purposes of simplicity, there may be any number of routers 22 between the switch 20-1 and the switch 20-2. The router 22 may be, for example, part of the public Internet, or may be part of a private network owned and managed by an entity that owns and manages the hosts 12 and 18. In some examples, such entity may be a cloud computing service provider.

The containers 14 are processes implemented via a containerization technology, such as, by way of non-limiting example, CRI-O or Docker. The hosts 12, as described in greater detail below, facilitate communications between containers 14 that have the same tenant ID. While for purposes of illustration and simplicity each host 12 is illustrated as hosting a single container 14, in practice, each host 12 may host tens, hundreds, or even thousands of different containers 14. The containers 14 on a single host 12 may be associated with the same tenant, or may be associated with multiple different tenants.

The cluster controller 16 maintains a host IP table 24 that contains the IP address of each host 12. The cluster controller 16 may obtain the IP addresses of the hosts 12 in any of a number of different ways. In one example, an operator 26 may preconfigure the cluster controller 16 with the IP address of each host 12. In another example, each host 12 may be preconfigured with the IP address of the host 18, and upon initiation of the host 12, may register itself with the cluster controller 16 and provide to the cluster controller 16 its IP address.

For purposes of illustration, assume that the cluster controller 16 determines that a new container 14 associated with a particular tenant having a tenant ID of 2 is to be initiated on one of the hosts 12. The mechanism for selecting a particular host 12 on which to run a container 14 may be based on any desired algorithm. In one example, the cluster controller 16 may, based on any desired criteria, select a particular host 12, such as the host 12-1, and direct the host 12-1 to initiate a new container 14. In other examples, each host 12 may listen to an event stream that is emitted by the cluster controller 16. When the cluster controller 16 determines that a new container 14 needs to be initiated, the cluster controller 16 emits an event that indicates that a new container 14 needs to be initiated, and one of the hosts 12, such as the host 12-1, responds to the cluster controller 16 and indicates that the host 12-1 is capable of initiating a new container 14, and the host 12-1 then initiates the new container 14. Again, solely for purposes of illustration, it will be assumed that the host 12-1 initiates a new container 14-1 that has an associated tenant ID (T_ID) of 2. The tenant ID of 2 may be maintained, for example, in metadata that is maintained for each container 14 by the host 12-1.

Similarly, over time, each of the hosts 12-2-14-6 initiates containers 14-2-14-6 that are associated with corresponding tenants, as indicated in parentheticals in FIG. 1. The container 14-1 generates and sends a communication addressed to the container 14-2. The host 12-1 receives a request to send the communication, and determines that the message is destined for the host 12-2. The host 12-1 accesses a host accessibility structure 28-1 and determines that this is the first attempt to communicate with the host 12-2. The host 12-1 then determines whether the host 12-1 is accessible via a layer two communications protocol or is accessible only via a layer three communications protocol. The host 12-1 may make this determination in any suitable manner. In one example, the host 12-1 sends an address resolution protocol (ARP) message to the host 12-2 to determine if the host 12-2 is reachable via a layer two communications protocol. If the ARP message is successful, then the host 12-2 is accessible via the layer two communications protocol. If the ARP message is not successful, the host 12-1 may determine that the host 12-2 is accessible only via a layer three network. Because the host 12-2 is coupled directly to the same layer two switch 20-1 as the host 12-1, the ARP message is successful, and the host 12-1 determines that the host 12-2 is accessible via a layer two communications protocol. The host 12-1 generates an entry 30-1A that identifies that the host 12-1 can communicate with the host 12-2 via the layer two communications protocol. The identification may be made via any desired information. In this example, the host 12-1 identifies the host 12-2 as being accessible via the layer two communications protocol by identifying in the entry 30-1A a layer two tunneling mechanism, a VLAN, that may be used to isolate traffic of different tenants which communicate over a layer two network.

The host 12-1 determines a VLAN tag for use with the communication from the container 14-1. In this example, the host 12-1 uses the tenant ID of 2 associated with the container 14-1. It will be apparent that the VLAN tag could be any desired identifier used to associate containers 14 with a particular tenant. For example, the VLAN tag may be created as a function of a tenant ID, or the VLAN tag may simply be the tenant ID. The VLAN tag may also be randomly generated and paired with the tenant ID by the cluster controller 16 when the tenant ID is created.

The host 12-1 inserts the VLAN tag in an Ethernet packet, and communicates the Ethernet packet to the host 12-2. The Ethernet packet is forwarded by the switch 20-1 to the host 12-2. The host 12-2 receives the Ethernet packet and determines that the VLAN tag of 2 corresponds to the tenant ID of 2. The host 12-2 determines that the container 14-2 has a tenant ID of 2, and delivers the Ethernet packet to the container 14-2. If the host 12-2 had determined that the container 14-2 had a different tenant ID, the host 12-2 may discard the Ethernet packet and not deliver the Ethernet packet to the container 14-2.

Assume that the container 14-1 generates and sends a second communication addressed to the container 14-2. The host 12-1 receives a request to send the second communication to the container 14-2, and determines that the second communication is destined for the host 12-2. The host 12-1 accesses the host accessibility structure 28-1 and, based on the entry 30-1A, determines that it has already been determined that the host 12-2 is accessible via a layer two tunnel. The host 12-1 uses the tenant ID of 2 as a VLAN tag in an Ethernet packet, and communicates the Ethernet packet to the host 12-2. The Ethernet packet is forwarded by the switch 20-1 to the host 12-2. The host 12-2 receives the Ethernet packet and determines that the VLAN tag of 2 identifies the tenant ID of 2. The host 12-2 determines that the container 14-2 also has a tenant ID of 2, and delivers the Ethernet packet to the container 14-2.

Assume that the container 14-1 generates and sends a third communication addressed to the container 14-4. The host 12-1 receives a request to send the third communication to the container 14-4, and determines that the third communication is destined for the host 12-4. The host 12-1 accesses the host accessibility structure 28-1 and determines that this is the first attempt to communicate with the host 12-4. The host 12-1 then determines whether the host 12-4 is accessible via a layer two communications protocol or is accessible only via a layer three communications protocol. Because the host 12-4 is only reachable via the router 22, the host 12-1 determines that the host 12-4 is accessible only via a layer three communications protocol. The host 12-1 generates an entry 30-2A that identifies that the host 12-1 can communicate with the host 12-4 via the layer three communications protocol. The identification may be made via any desired information. In this example, the host 12-1 identifies the host 12-4 as being accessible via the layer three communications protocol by identifying in the entry 30-2A a layer three tunneling mechanism, a VXLAN, that may be used to isolate traffic of different tenants which communicate over a layer three network.

Depending on the particular layer three tunneling mechanism, the host 12-1 may first initiate a layer three tunnel between the host 12-1 and the host 12-4. Such initiation may involve any suitable communications handshake between the hosts 12-1 and 12-4 required by the particular layer three tunneling mechanism. In this example, no handshake mechanism is necessary for a VXLAN tunnel, and thus the host 12-1 initially determines a VXLAN tag for use with the communication from the container 14-1. In this example, the host 12-1 uses the tenant ID associated with the container 14-1. The phrase "tag" as used herein refers to any labelling mechanism used by a layer two or layer three communications protocol to distinguish traffic between different tenants. For example, in the context of VXLAN, the VXLAN tag may comprise a Network ID, sometimes referred to as a VNID. The host 12-1 inserts the VXLAN tag of 2 into a communications packet, and communicates the communications packet to the host 12-4 that follows a communications path through the switch 20-1, the router 22, and the switch 20-2 to the host 12-4. The communications packet is forwarded by the switch 20-2 to the host 12-4. The host 12-4 receives the communications packet and determines that the VXLAN tag of 2 corresponds to the tenant ID of 2. The host 12-4 determines that the container 14-4 has a tenant ID of 2, and delivers the communications packet to the container 14-4. If the host 12-4 had determined that the container 14-4 was associated with a different tenant ID, the host 12-4 may discard the communications packet and not deliver the communications packet to the container 14-4.

In this manner, the hosts 12 can automatically, dynamically, and without human involvement, determine a best tunneling/isolation mechanism between hosts 12 whether the hosts 12 are on a same layer two network, or are reachable only via a layer three network.

Figure 2:
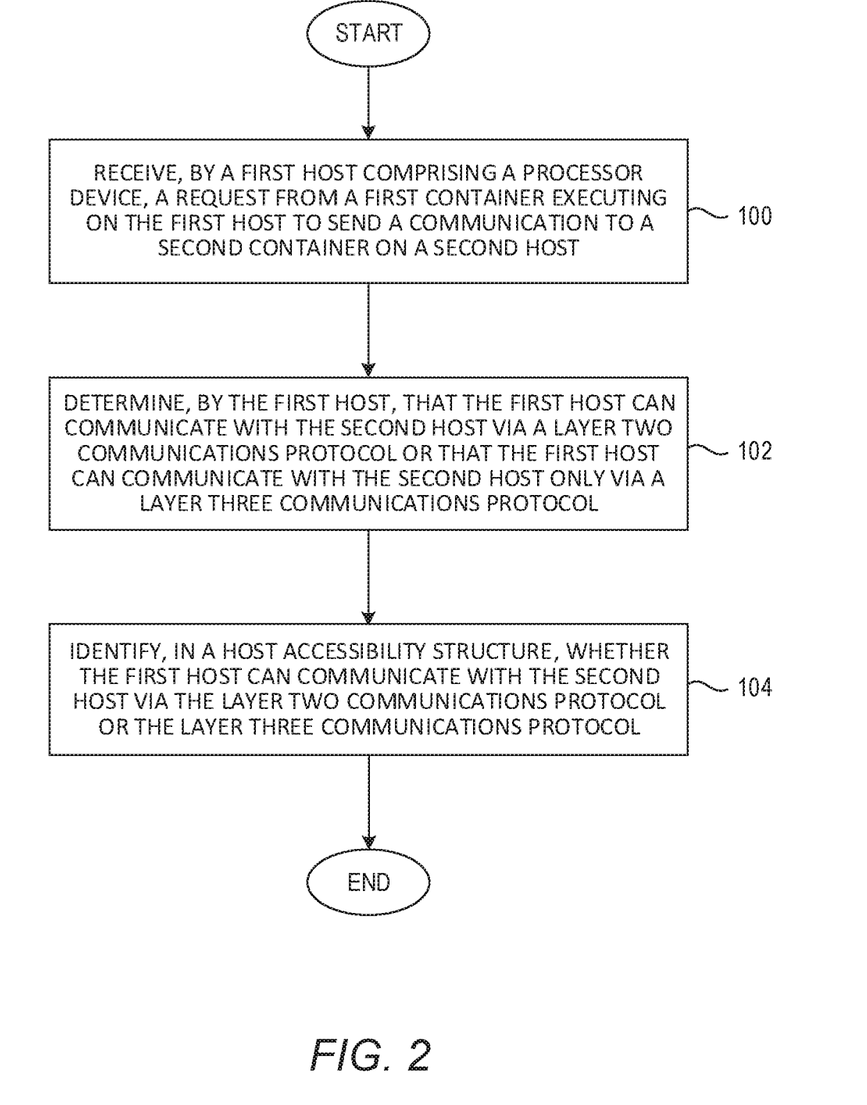
FIG. 2 is a flowchart of a method for dynamic cluster host interconnectivity based on reachability characteristics according to one example.

FIG. 2 is a flowchart of a method for dynamic cluster host interconnectivity based on reachability characteristics according to one example. FIG. 2 will be discussed in conjunction with FIG. 1. The host 12-1 receives a request from the container 14-1 executing on the host 12-1 to send a communication to the container 14-2 on the host 12-2 (FIG. 2, block 100). The host 12-1 determines that the host 12-1 can communicate with the host 12-2 via a layer two communications protocol or that the host 12-2 can communicate with the host 12-2 only via a layer three communications protocol (FIG. 2, block 102). The host 12-1 identifies, in the host accessibility structure 28-1, whether the host 12-1 can communicate with the host 12-2 via the layer two communications protocol or the layer three communications protocol (FIG. 2, block 104).

Figure 3:
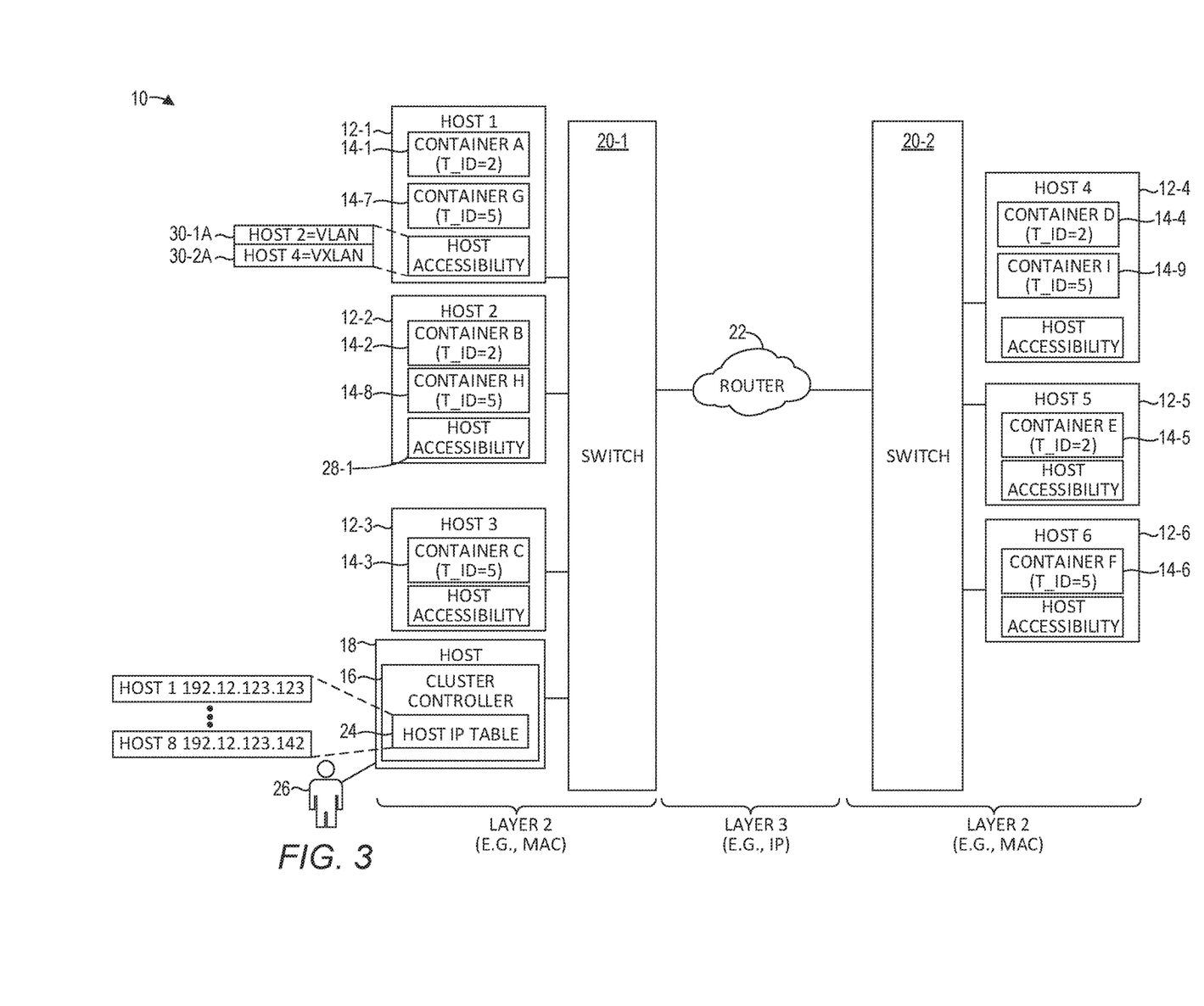
FIG. 3 is a block diagram of the environment illustrated in FIG. 1, showing additional aspects of the examples.

FIG. 3 is a block diagram of the environment 10 illustrated in FIG. 1, showing additional aspects of the examples. A container 14-7 executing on the host 12-1 sends a communication addressed to a container 14-8 executing on the host 12-2. The host 12-1 receives the request to send the communication to the container 14-8, and determines that the container 14-8 executes on the host 12-2. The host 12-1 accesses the host accessibility structure 28-1 and, based on the entry 30-1A, determines that it has already been determined that the host 12-2 is accessible via a layer two tunnel. The host 12-1 uses the tenant ID of 5 as a VLAN tag in an Ethernet packet, and communicates the Ethernet packet to the host 12-2. The Ethernet packet is forwarded by the switch 20-1 to the host 12-2. The host 12-2 receives the Ethernet packet and determines that the VLAN tag of 5 identifies the tenant ID of 5. The host 12-2 determines that the container 14-8 has a tenant ID of 5, and delivers the Ethernet packet to the container 14-8.

The container 14-7 sends a second communication addressed to a container 14-9 executing on the host 12-4. The host 12-1 receives the request to send the communication to the container 14-9, and determines that the container 14-9 executes on the host 12-4. The host 12-1 accesses the host accessibility structure 28-1 and, based on the entry 30-2A, determines that it has already been determined that the host 12-4 is accessible via a layer three tunnel.

The host 12-1 determines a VXLAN tag for use with the communication from the container 14-1. In this example, the host 12-1 uses the tenant ID of 5 associated with the container 14-7. The host 12-1 inserts the VXLAN tag of 5 into a communications packet, and communicates the communications packet to the host 12-4 that follows a communications path through the switch 20-1, the router 22, and the switch 20-2 to the host 12-4. The communications packet is forwarded by the switch 20-2 to the host 12-4. The host 12-4 receives the communications packet and determines that the VXLAN tag of 5 corresponds to the tenant ID of 5. The host 12-4 determines that the container 14-9 has a tenant ID of 5, and delivers the communications packet to the container 14-9.

In some examples, if a host 12 is accessible only via a layer three communications protocol, a host 12 may automatically initiate an Internet Protocol Security (IPsec) tunnel in conjunction with the VXLAN tunnel so that the communications between the containers 14 are encrypted. This may be particularly suitable where the router 22 is part of a public network, such as the internet.

Figure 4:
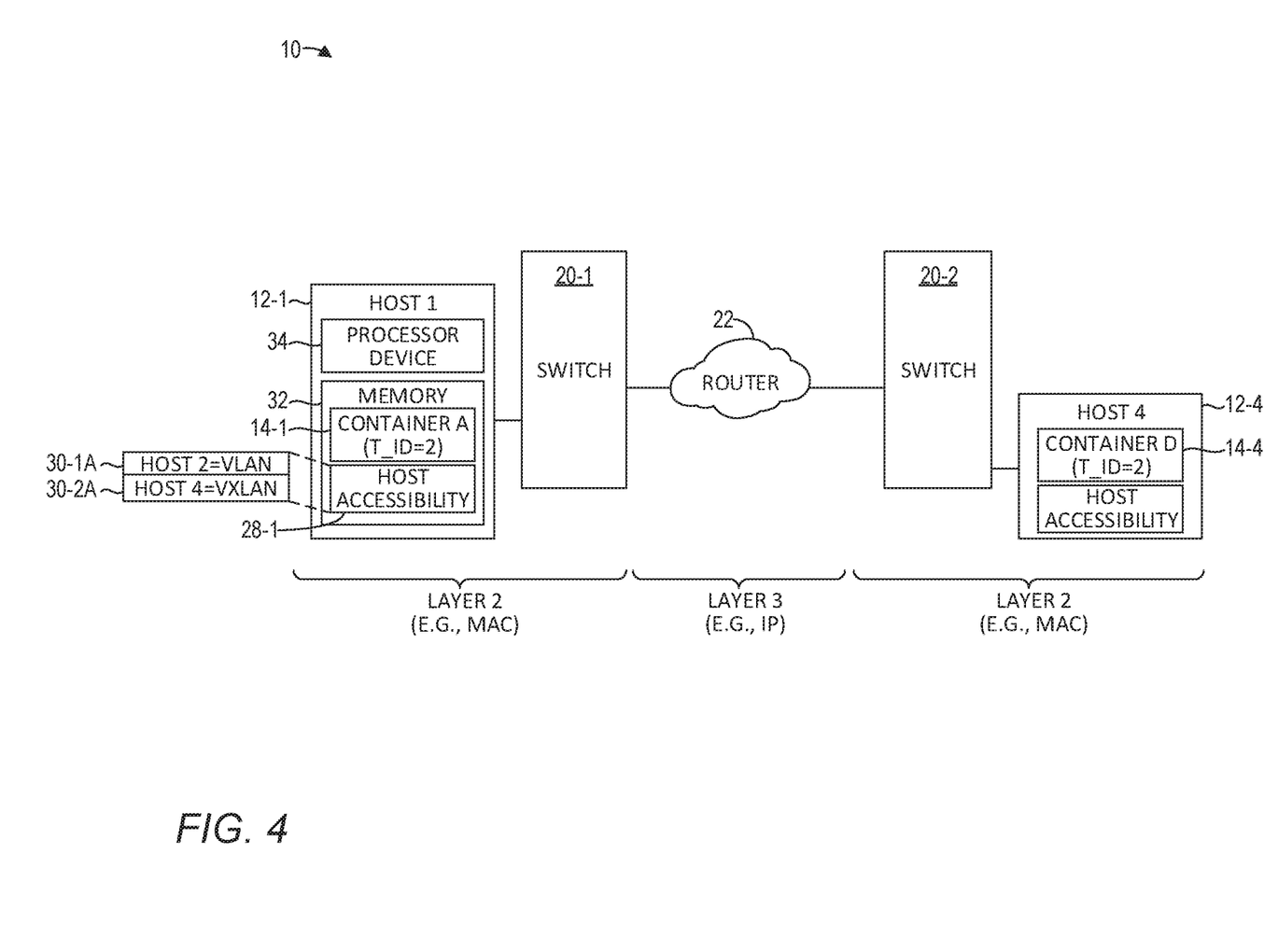
FIG. 4 is a simplified block diagram of the environment illustrated in FIG. 1.

FIG. 4 is a simplified block diagram of the environment 10 illustrated in FIG. 1. The host 12-1 includes a memory 32 and a processor device 34 coupled to the memory 32. The host 12-1 may comprise a computing device, sometimes referred to as a "bare metal" computing device, or, in other examples may comprise a virtual machine that is implemented on a computing device. In the latter examples, the virtual machine may have use of the processor device 34 for intervals of time, and other virtual machines implemented on the computing device may have use of the processor device 34 for other intervals of time. In some examples, the functionality discussed above with regard to the host 12-1 may be implemented, at least in part, via software instructions that program the processor device 34 to implement the functionality discussed above. In such examples, functionality implemented by the host 12-1 may also be attributed to the processor device 34 since the processor device 34 is a component of the host 12-1. The processor device 34 is to initiate the container 14-1. The processor device 34 is further to receive a request from the container 14-1 to send a communication to the container 14-4 on the second host 12-2. The processor device 34 is to determine that the host 12-1 can communicate with the host 12-4 via a layer two communications protocol or that the host 12-1 can communicate with the host 12-4 only via a layer three communications protocol. The processor device 34 is to identify, in the host accessibility structure 28-1, that the host 12-1 can communicate with the host 12-4 only via the layer three communications protocol.

Figure 5:
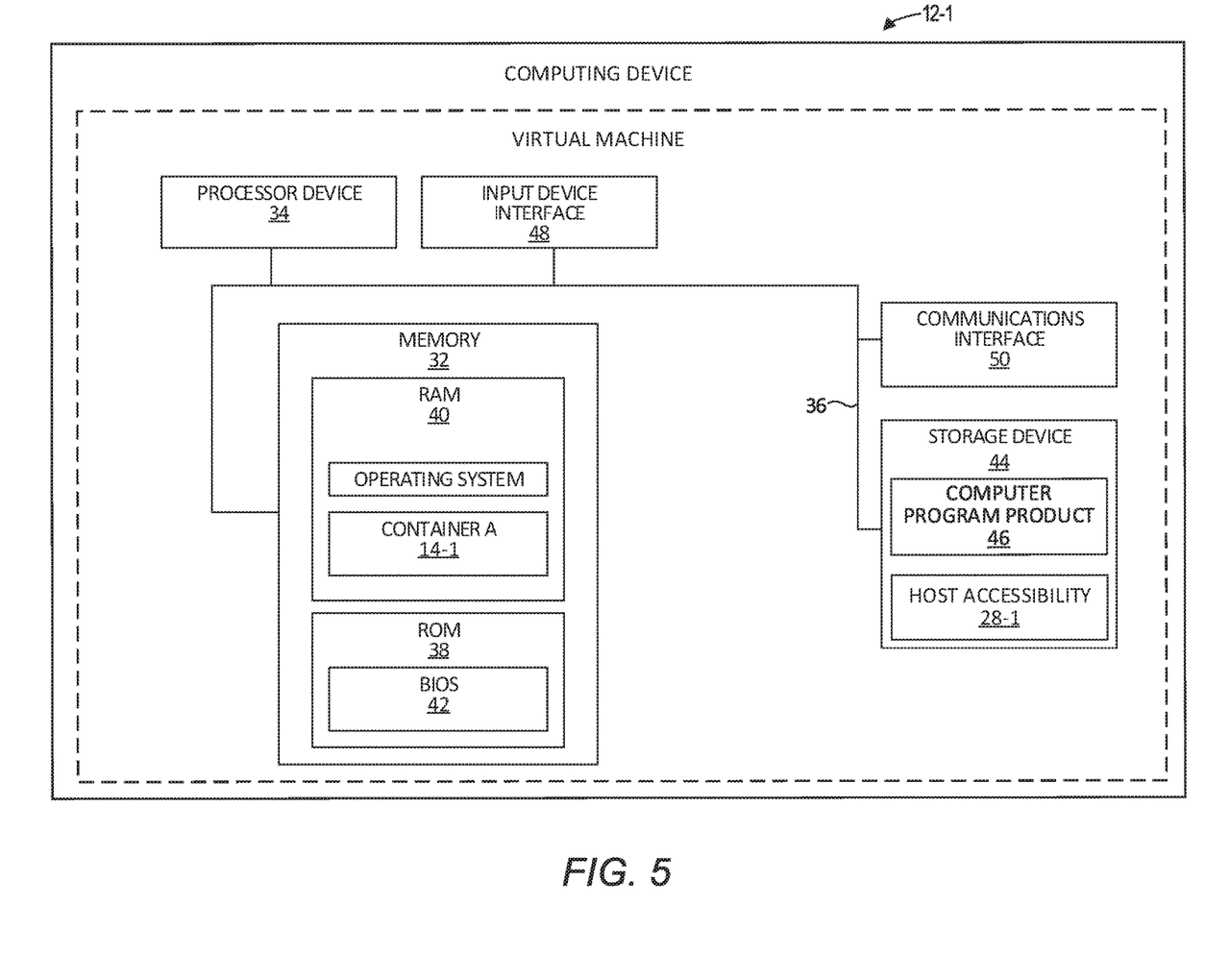
FIG. 5 is a block diagram of a host suitable for implementing examples.

FIG. 5 is a block diagram of the host 12-1 suitable for implementing examples according to one example. The host 12-1 may comprise any computing or electronic device capable of including firmware, hardware, and/or executing software instructions to implement the functionality described herein, such as a computer server, a desktop computing device, a laptop computing device, a smartphone, a computing tablet, or the like. As discussed above, in some examples, the host 12-1 may also comprise a virtual machine. The host 12-1 includes the processor device 34, the memory 32, and a system bus 36. The system bus 36 provides an interface for system components including, but not limited to, the memory 32 and the processor device 34. The processor device 34 can be any commercially available or proprietary processor.

The system bus 36 may be any of several types of bus structures that may further interconnect to a memory bus (with or without a memory controller), a peripheral bus, and/or a local bus using any of a variety of commercially available bus architectures. The memory 32 may include non-volatile memory 38 (e.g., read-only memory (ROM), erasable programmable read-only memory (EPROM), electrically erasable programmable read-only memory (EEPROM), etc.), and volatile memory 40 (e.g., random-access memory (RAM)). A basic input/output system (BIOS) 42 may be stored in the non-volatile memory 38 and can include the basic routines that help to transfer information between elements within the host 12-1. The volatile memory 40 may also include a high-speed RAM, such as static RAM, for caching data.

The host 12-1 may further include or be coupled to a non-transitory computer-readable storage medium such as a storage device 44, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 44 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 44 and in the volatile memory 40, including an operating system and one or more program modules, such as the container 14-1. All or a portion of the examples may be implemented as a computer program product 46 stored on a transitory or non-transitory computer-usable or computer-readable storage medium, such as the storage device 44, which includes complex programming instructions, such as complex computer-readable program code, to cause the processor device 34 to carry out the steps described herein. Thus, the computer-readable program code can comprise software instructions for implementing the functionality of the examples described herein when executed on the processor device 34.

The operator 26 (FIG. 1), may also be able to enter one or more configuration commands through a keyboard (not illustrated), a pointing device such as a mouse (not illustrated), or a touch-sensitive surface such as a display device (not illustrated). Such input devices may be connected to the processor device 34 through an input device interface 48 that is coupled to the system bus 36 but can be connected by other interfaces such as a parallel port, an Institute of Electrical and Electronic Engineers (IEEE) 1394 serial port, a Universal Serial Bus (USB) port, an IR interface, and the like. The host 12-1 may also include a communications interface 50 suitable for communicating with the switch 20-1 as appropriate or desired.

Individuals will recognize improvements and modifications to the preferred examples of the disclosure. All such improvements and modifications are considered within the scope of the concepts disclosed herein and the claims that follow.

What is claimed is:

1. A method comprising:
    receiving, by a first host comprising a processor device, a request from a first container executing on the first host to send a communication to a second container on a second host;
    determining, by the first host, that the first host can communicate with the second host via a layer two communications protocol or that the first host can communicate with the second host only via a layer three communications protocol;
    identifying, in a host accessibility structure, whether the first host can communicate with the second host via the layer two communications protocol or the layer three communications protocol; and
    in response to determining that the first host can communicate via the layer two communications protocol:
        determining a tenant that corresponds to the first container;
        determining a layer two tag that corresponds to the tenant; and
        sending the communication and the layer two tag via a layer two tunnel to the second container on the second host.

2. The method of claim 1 wherein the layer two tunnel comprises a virtual local area network (VLAN) tunnel.

3. The method of claim 1 further comprising:
    receiving, by the first host, a request from a third container executing on the first host to send a communication to a fourth container on the second host;
    determining, based on the host accessibility structure, that the first host can communicate with the second host via the layer two communications protocol;
    determining a layer two tag associated with the third container; and
    sending the communication and the layer two tag associated with the third container via the layer two tunnel to the fourth container on the second host.

4. The method of claim 1 further comprising:
    receiving, by the first host, a request from a third container executing on the first host to send a communication to a fourth container on a third host;
    determining, by the first host, that the first host can communicate with the third host only via the layer three communications protocol;
    identifying, in the host accessibility structure, that the first host can communicate with the third host via the layer three communications protocol;
    determining a layer three tag associated with the third container; and
    sending the communication and the layer three tag associated with the third container via a layer three tunnel to the fourth container on the third host.

5. A host, comprising:
    a memory; and
    a processor device coupled to the memory to:
        initiate a first container;
        receive a request from the first container to send a communication to a second container on a second host;
        prior to sending the communication, make a determination that the host can communicate with the second host via a layer two communications protocol or that the host can communicate with the second host only via a layer three communications protocol;
        based on the determination, store, in a host accessibility structure, information that identifies whether the host is to communicate with the second host via the layer two communications protocol or the layer three communications protocol;
        in response to determining that the host can communicate with the second host via the layer two communications protocol:
            determine a tenant that corresponds to the first container;
            determine a layer two tag that corresponds to the tenant; and
            send the communication and the layer two tag via a layer two tunnel to the second container on the second host.

6. The host of claim 5 wherein the layer two tunnel comprises a virtual local area network (VLAN) tunnel.

7. A computer program product stored on a non-transitory computer-readable storage medium and including instructions to cause a processor device to:
- initiate a first container on a first host;
- receive a request from the first container to send a communication to a second container on a second host;
- in response to receiving the request, determine that the first host can communicate with the second host via a layer two communications protocol or that the first host can communicate with the second host only via a layer three communications protocol;
- identify, in a host accessibility structure, whether the first host can communicate with the second host via the layer two communications protocol or the layer three communications protocol; and
- in response to determining that the first host can communicate via the layer two communications protocol:
  - determine a tenant that corresponds to the first container;
  - determine a layer two tag that corresponds to the tenant; and
  - send the communication and the layer two tag via a layer two tunnel to the second container on the second host.

* * * * *